Dec. 30, 1924.

A. M. MacFARLAND 1,521,031

ELECTRICALLY HEATED SOLDER POT

Filed July 19, 1921  4 Sheets-Sheet 1

WITNESSES:
John W. Whiting
H. M. Bishel

INVENTOR
Allis M. MacFarland
BY
Wesley G. Elster
ATTORNEY

Dec. 30, 1924.

A. M. MacFARLAND 1,521,031

ELECTRICALLY HEATED SOLDER POT

Filed July 19, 1921

WITNESSES:
John W. Whiting
N M Biebel

INVENTOR
Allis M. MacFarland
BY
Wesley G Carr
ATTORNEY

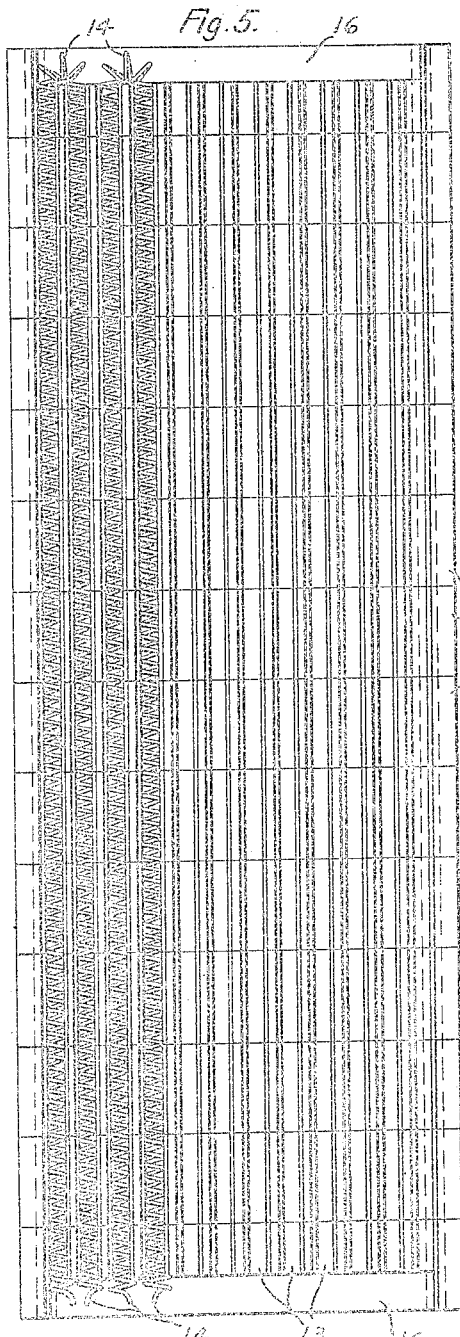
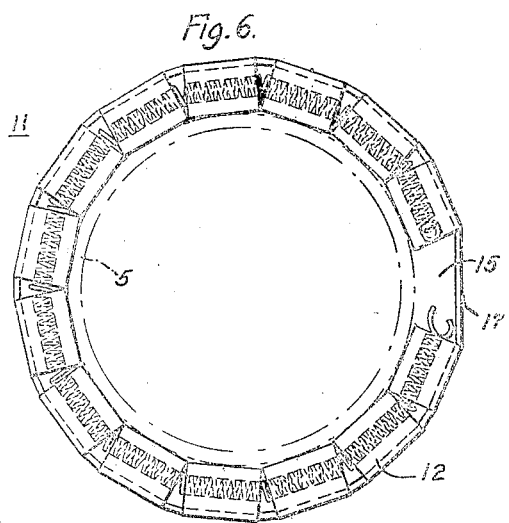
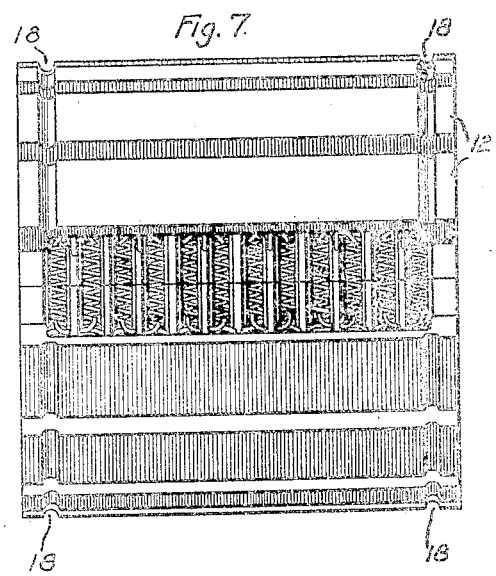

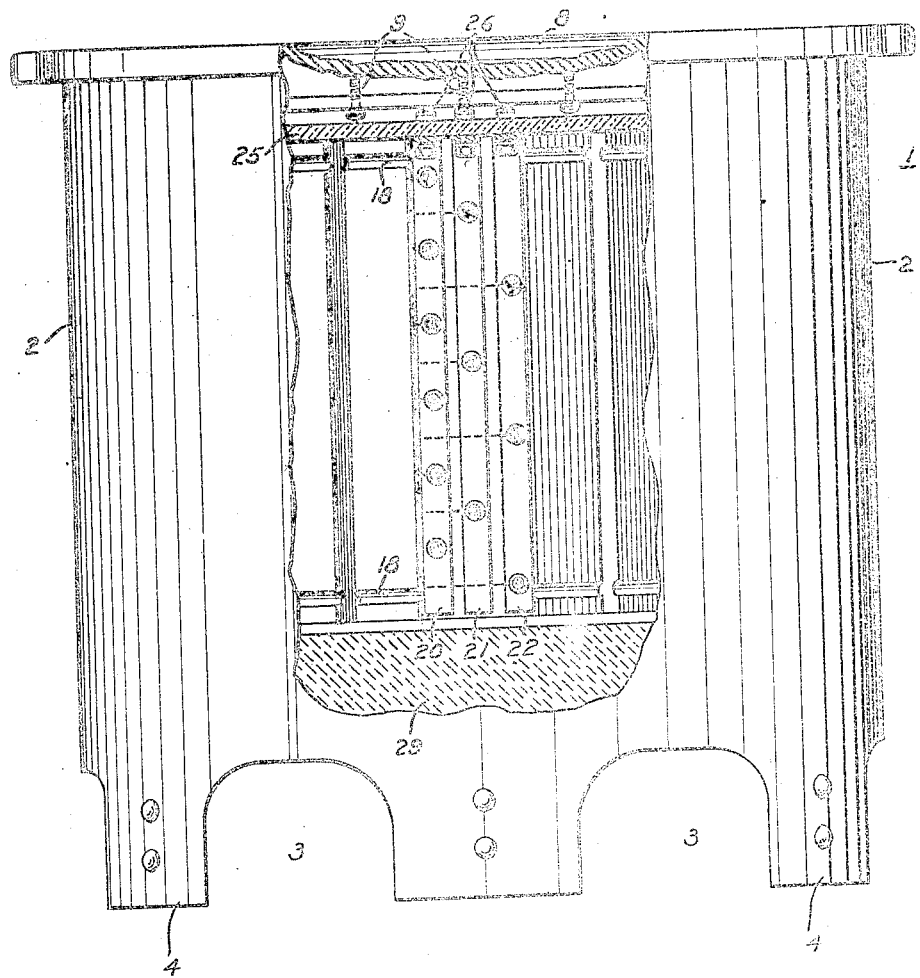

Patented Dec. 30, 1924.

1,521,031

UNITED STATES PATENT OFFICE.

ALLIS M. MacFARLAND, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICALLY-HEATED SOLDER POT.

Application filed July 19, 1921. Serial No. 485,881.

*To all whom it may concern:*

Be it known that I, ALLIS M. MACFARLAND, a citizen of the United States, and a resident of Wilkinsburg, in the county of Allegheny and State of Pennsylvania, have invented a new and useful Improvement in Electrically-Heated Solder Pots, of which the following is a specification.

My invention relates to electrically heated apparatus and particularly to electrically heated solder pots, and it has for one of its objects to provide a relatively simple and compact device of the above indicated character.

Another object is to provide a flexible heating element comprising a plurality of resistor-supporting members which may be combined to form a heating element of any suitable or desired size for application to solder pots of various dimensions.

In practicing my invention, I provide a substantially cylindrical metal casing, the lower portion of which is so shaped as to form supporting members. I provide a substantially cylindrical inner container made of relatively thin sheet metal and suitably secured thereto, at its upper edge, a surrounding metal ring. I provide a flange cover member which is secured to the top of the inner container by means of bolts passing through the ring secured at the top of the container. The flanged cover member is of such outer dimensions as to permit of locating it on the top of the casing, whereby the flanged member, the container and any material contained therein is supported by the upper edge of the outer casing.

I provide a heating element comprising a plurality of elongated relatively narrow refractory supporting members each having a plurality of grooves extending laterally therethrough. The resistor-supporting members are placed in side-by-side relation, and a metallic resistor, preferably a wire helix, is located in the grooves. The lateral cross section of the supporting members may have the form of a square or other rectangle or a triangle. The assembled heating element constitutes a substantially flexible member which may be easily and quickly applied against the outer peripheral surface of the inner container and be maintained in its operative position by suitable means secured to the outside of the container.

I provide a plurality of terminal bars, the upper ends of which are located in a cover member secured against the outside of the casing which is provided with conduits in which the supply-circuit conductors may be located.

In order to maintain the temperature of the solder or of the Babbitt metal in the container at any desired value, I provide a thermostat which is so located as to be in close heat-conducting relation to the material contained in the container and yet out of direct contact therewith. I provide also, means for varying the amount of heat which may be conducted to the thermostat to permit of easily and quickly varying the predetermined temperature at which it is desired to maintain the molten material.

In the drawings;

Fig. 5 is a developed view of an electric heating element constituting a part of my invention;

Fig. 6 is a top plan view of a heating element applied to the outside peripheral surface of the container;

Fig. 7 is a view, in side elevation, of the heating element illustrated in Fig. 6, and Fig. 8 is a view, in side elevation, of the device embodying my invention, certain portions being broken away to more clearly illustrate the terminal construction of the heating element.

Figure 1:
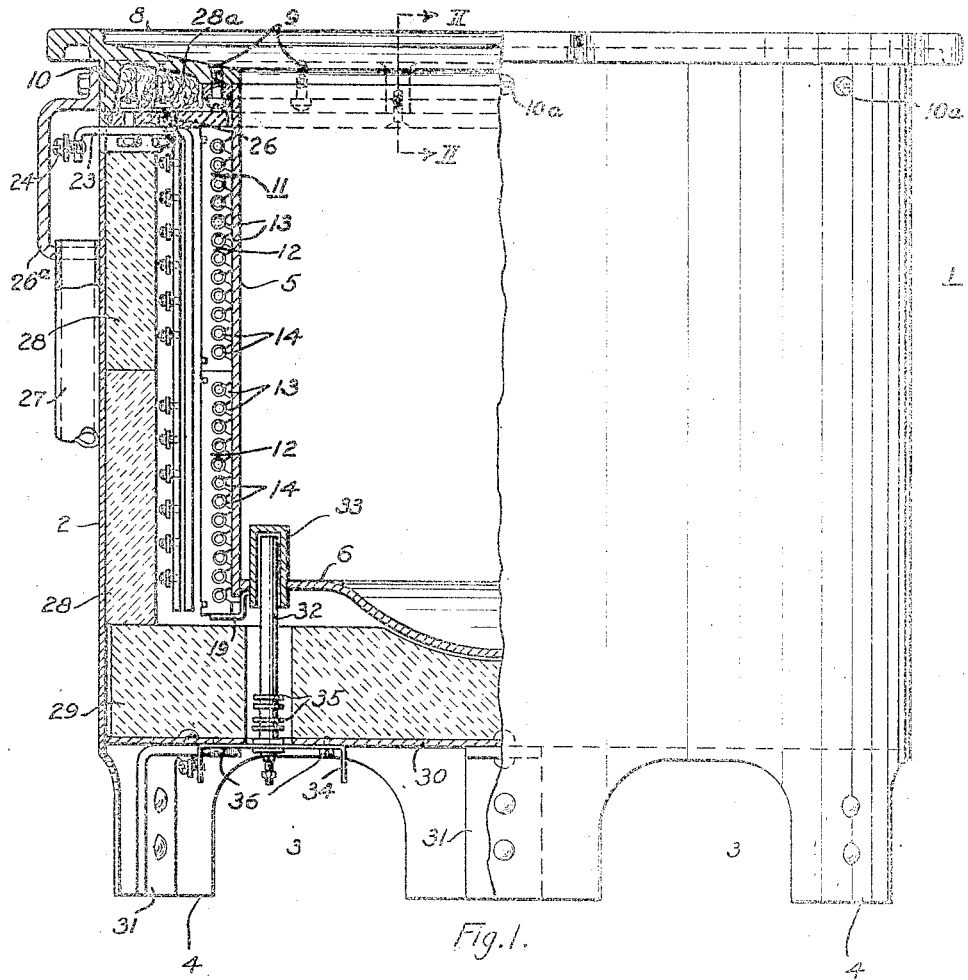
Figure 1 is a view, partly in side elevation and partly in section, of a solder pot embodying my invention.
Figure 2:
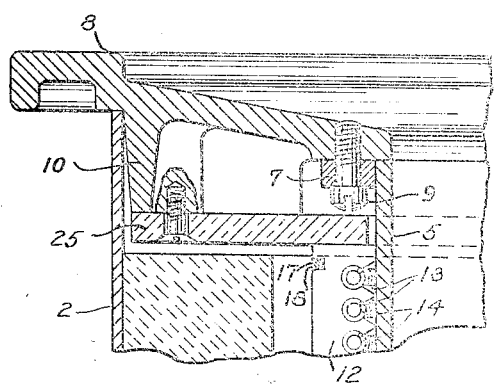
Fig. 2 is a view, in vertical cross section, on the line II—II of Fig. 1.
Figure 3:
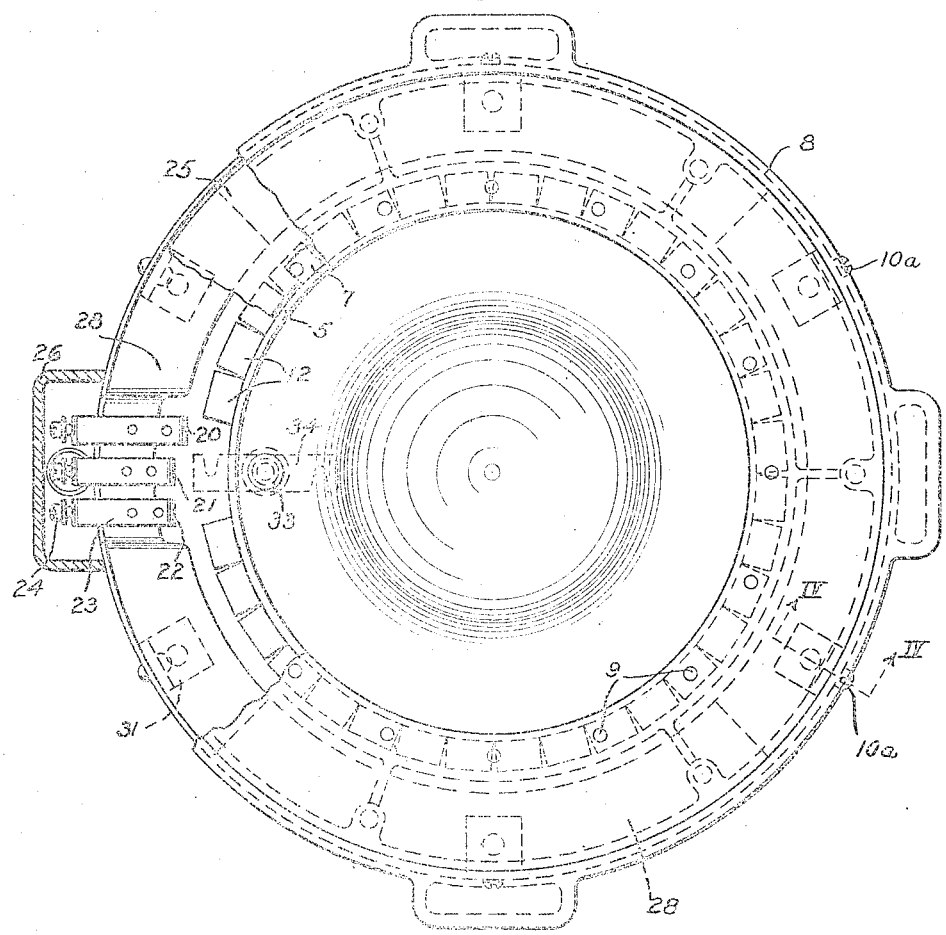
Fig. 3 is a top plan view, certain portions being cut away, of a solder pot embodying my invention.
Figure 4:
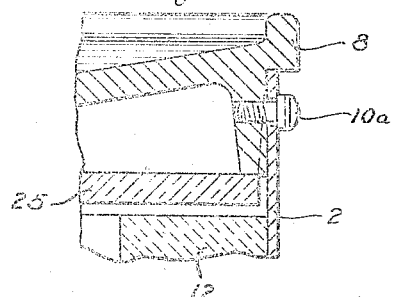
Fig. 4 is a view, in vertical cross section, on the line IV—IV of Fig. 3.

A solder pot designated generally by the numeral 1, comprises an outer relatively thin metallic casing 2 having recesses 3 in its lower edge to provide a plurality of supporting members 4.

A container 5 for the solder or Babbitt metal to be melted comprises a substantially cylindrical casing having an upper open end and a closed lower end, which latter is formed by a bottom member 6. The bottom 6 may be welded to the container 5 or the two parts 5 and 6 may be formed integral with each other, as by stamping the same. An annular ring 7 is located on the outside of the container 5 and may be suitably secured thereto adjacent the upper edge thereof by brazing or welding.

A combined flange-and-cover member 8 comprises a substantially horizontally extending annular ring, the inner diameter of which is substantially equal to the inner diameter of the container 5. The member 8 is secured against the members 5 and 7 by a plurality of screws or bolts 9 which project through the ring 7. The member 8 is provided with a downwardly extending circular flange portion 10, the outer diameter of which is substantially equal to the inner diameter of the casing 2. When the flange member 8, together with the container 5 secured thereto, is located on the upper edge of the casing 2, it is substantially coaxial therewith by reason of the depending flange member 10. Screws 10ª serve to hold the member 8 in operative relation on the casing 2.

A heating element, designated in general by the numeral 11, comprises a plurality of relatively narrow elongated refractory members 12, each having a plurality of grooves 13 extending laterally therethrough. A resistor 14 comprises a helically wound wire located in the grooves 13.

To build up a complete heating element, a suitable number of members 12 are laid in side-by-side relation on a level surface, the number employed being such as will be slightly less than the outer periphery of the container 5, a space 15 being left in which terminal bars may be located. The resistor 14 is then threaded through the slots of the adjacent and successive members 12, the length of each of the resistor elements 14 being such as to be substantially equal to a multiple of the width of the assembled members 12 so that the beginning and the end of any one element are adjacent to each other when in operative position for connection to terminal bars to be hereinafter described more in detail. The end pieces 12 may be provided with a recess 16 extending longitudinally of the member to permit of covering the return bends and the ends of the helix by the refractory material of the end member.

While I have illustrated the members 12 as being substantially rectangular in lateral cross section, I do not wish to be limited thereto, as I may make these members substantially triangular in lateral cross section, the base of the triangle being the outside flat surface thereof.

After all of the grooves in the members 12, or as many of them as may be necessary, have been filled with the resistors 14, the heating element may be placed around the container 5 and, if the members 12 are substantially rectangular, as illustrated, the heating element, when in its operative position, will be substantially as illustrated in Fig. 6. It may be noted that the turns of the helical resistor element 14 located immediately adjacent the abutting surfaces of any two adjacent members are slightly separated. If desired, close operative engagement of the inner surfaces of the members 12 with the outer peripheral surface of the container 5 may be assured by placing a wire 17 around the heating element 11 in grooves 18 provided near the ends of the members 12 in the outer surface thereof.

In order to maintain the heating element 11, in its proper operative position, relatively to the container 5, a plurality of supporting members 19 of substantially Z-shape may be used, one portion thereof being secured against the bottom member 6 of the container. While I have illustrated the member 19 as of Z-shape, this is not material, as the form of the supporting member 19 depends upon the relative dimensions of the container 5 and of the heating element 11 when they occupy their relative operative positions.

As a heating element comprises a plurality of resistor elements 14, a plurality of terminal bars 20, 21 and 22 are provided to permit of so connecting thereto the various resistor elements 14 as to permit of selectively varying the amount of energy expended therein. As illustrated in Fig. 8, one end of each of the elements 14 is connected to the terminal bar 20 while the other end of alternating elements 14 are connected to the bars 21 and 22, respectively. By providing suitable control means (not shown), I may so connect the heating elements 14 as to cause all of them to be traversed by an electric current at the same time, or only a portion thereof, as, for instance, those connected to the terminal bar 21 and the terminal bar 20, or I may so connect them that the two groups of three elements each shall be connected in series-circuit relation, thus providing "high," "intermediate" and "low" heats.

The terminal bars 20, 21 and 22 are located in substantially vertical positions outside of the inner container 5 and are severally provided with a substantially horizontal extension portion 23 which has a downwardly extending part provided with a screw or bolt 24 which serves to suitably connect the ends of supply-circuit conductors (not shown) to the bus bars 20, 21 and 22.

The bus bars are maintained in their proper operative positions by being severally bolted against an annular insulating plate 25 which is, in turn, bolted against a portion of the downwardly extending flange 10 of the cover member 8. Bolts 26 serve to secure the portions 23 of the terminal bars against the plate 25.

A cover member 26ª for the upper horizontally extending portions of the terminal bars, is bolted against the outer surface of the casing 2 and is provided, in its lower flange, with a downwardly extending conduit member 27 in which the supply circuit conductors (not shown) may be located.

In order to reduce the amount of heat radiated downwardly and sidewise, I provide heat-insulating material inside of the casing 2 comprising suitably shaped blocks 28 of a suitable heat-insulating material. A block of heat-insulating material 29 is located beneath the bottom of the container 5 and is held in place by means of a substantially circular disk 30 which is, in turn, maintained in its proper operative position by means of a plurality of brackets 31 secured against the inside of the casing-supporting members 4. Heat-insulating material 28ª is located between the flange member 8 and the annular plate 25 to reduce the heat flow from the ring 7 and the flange member 8.

In order to provide a means for indicating regulation of temperature of the molten material located in the container 5 when in operation, I provide a thermostat 32 which projects into the container 5 through the bottom member 6 and is protected against contact with the molten material by a tubular member 33 suitably secured to the bottom member 6. The thermostat 32 may be maintained in its operative position by means of a metal strip 34 engaging the thermostat between a cooperating pair of annular integral flanges 35 on the thermostat 32. A plurality of pairs of flanges may be provided to permit of varying the position of the thermostat with reference to the bottom member 6. The member 34 may be suitably secured against the member 30 by means of screws or bolts 36. The thermostat and its operation are more fully described and claimed in my co-pending application, Serial No. 485,882, filed July 19, 1921.

It may be noted that the device embodying my invention provides a heat-insulated casing in which the material container is located with a heating element in relatively intimate contact with the container. The heating element comprising a portion of the device embodying my invention, is a relatively simple and easily installed flexible heating element easily adapted to various sizes and shapes of containers. Relatively simple heating-element-supporting means are provided as are also an improved terminal-bar construction to permit of selectively varying the energization of the heating element.

Various modifications may be made in the device embodying my invention without departing from the spirit and scope thereof and I desire that only such limitations shall be placed thereon as are imposed by the prior art or are specifically set forth in the appended claims.

I claim as my invention:

1. An electrically heated solder-pot comprising an outer casing, a container for the material being heated, an annular flange member secured to said container and supporting it from the casing, a flexible heating element encircling said container and contact terminals for said heating element supported by, and depending from, said annular flange member.

2. An electrically heated solder-pot comprising an outer casing, an inner container provided, at its upper end, with an annular flange whereby said container is supported on said casing, a flexible heating element located on the outer peripheral surface of said container, means on said container for holding said heating element in its operative position, heat-insulating material inside of said casing and surrounding said heating element and additional heat insulating material below said container and operative to maintain said first named heat-insulating material in its operative position relatively to said casing.

3. In an electrically heated solder-pot the combination with an outer casing and a container for the material being heated, of a flexible heating element surrounding said container and comprising a plurality of elongated narrow refractory supporting members, each having a plurality of laterally extending grooves in one face and a helically wound resistor wire located in said grooves, the relative lateral movement of adjacent supporting members being permitted by the movement of adjacent turns of the helically-wound resistor.

4. An electrically heated device comprising a flexible heating element, said heating element comprising a plurality of elongated, relatively narrow, refractory supporting members, each having a plurality of laterally-extending grooves in one face, and a helically wound resistor located in said grooves, relative lateral movement of adjacent supporting members being permitted by the movement of adjacent turns of the resistor.

5. An electrically heated device comprising a surface to be heated and a flexible heating element located closely adjacent to said surface and comprising a plurality of elongated, relatively narrow, refractory supporting members, each having a plurality of laterally-extending grooves in one face, and a helically wound resistor wire located in said grooves and permitting relative lateral movement of adjacent supporting members by the movement of adjacent turns of resistor wire.

6. An electrically heated device comprising a flexible heating element, said heating element comprising a plurality of elongated, relatively narrow, refractory supporting members, each having a plurality of spaced grooves in one face, and a helically wound resistor member extending through said grooves, said resistor member serving also as a means for holding said refractory supports in yielding, parallel relation relatively to each other.

7. An electrically heated device comprising a flexible heating element, said heating element comprising a plurality of elongated, relatively narrow, refractory supporting members located in adjacent, parallel-spaced relation relatively to each other, each having a plurality of grooves in one face, and a helically wound resistor member extending through said grooves, said resistor member permitting said refractory supporting members to have limited turning movement relatively to each other to fit the heating element against a curved surface.

8. An electrically heated device comprising a flexible heating element, said heating element comprising a plurality of elongated, relatively narrow, refractory supporting members, each having a plurality of spaced grooves in one face, and a helically wound resistor member extending through said grooves, said resistor member serving also as a means for holding said refractory supports in yielding, parallel relation relatively to each other, and permitting a limited turning movement of said refractory supporting members relatively to each other, whereby the heating element may fit closely against a curved surface.

9. An electrically heated device comprising a flexible heating element, said heating element comprising a plurality of elongated, relatively narrow refractory supporting members, each having a plurality of symmetrically spaced, laterally extending grooves in one face, said supporting members being located in closely adjacent parallel-extending relation with the grooves in the supporting members in registry with each other, and a single continuous resistor member located in and extending through a plurality of sets of grooves.

10. An electrically heated device comprising a flexible heating element said heating element comprising a plurality of elongated, relatively narrow, refractory supporting members, each having a plurality of laterally-extending grooves in one face, and a resistor member located in said grooves and having integral means for permitting limited turning movement of the supporting members relatively to each other.

11. An electrically heated device comprising a flexible heating element, said heating element comprising a plurality of elongated, relatively narrow, refractory supporting members, each having a plurality of laterally-extending grooves in one face, and a resistor member located in said grooves and having integral means for permitting the supporting members to fit closely against a curved surface.

12. An electrically heated device comprising a flexible heating element, said heating element comprising a plurality of elongated, relatively narrow, refractory supporting members, each having a plurality of symmetrically spaced, laterally extending grooves in one face, said supporting members being located in closely adjacent parallel-extending relation with the grooves in the supporting members in registry with each other, and a single continuous resistor member located in and extending through a plurality of sets of grooves, said resistor member having embodying means for permitting the supporting members to fit closely against a curved surface.

In testimony whereof, I have hereunto subscribed my name this 11th day of July, 1921.

ALLIS M. MACFARLAND.